May 7, 1940. W. E. WHITNEY 2,199,974
CONTROLLING DEVICE
Filed Feb. 26, 1937  2 Sheets-Sheet 1

Inventor,
William E. Whitney,
by Roberts, Cushman & Woodberry
Att'ys

May 7, 1940.    W. E. WHITNEY    2,199,974
CONTROLLING DEVICE
Filed Feb. 26, 1937    2 Sheets-Sheet 2
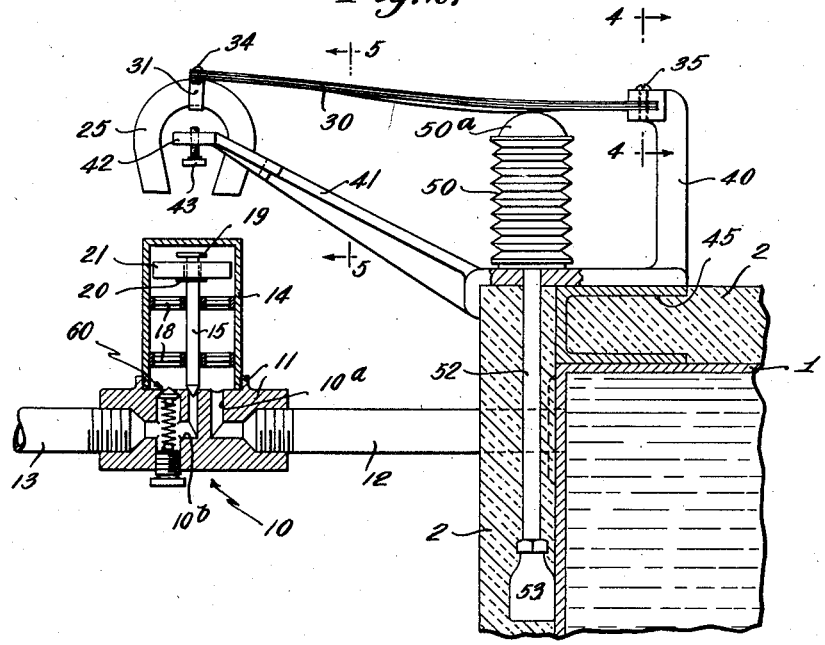
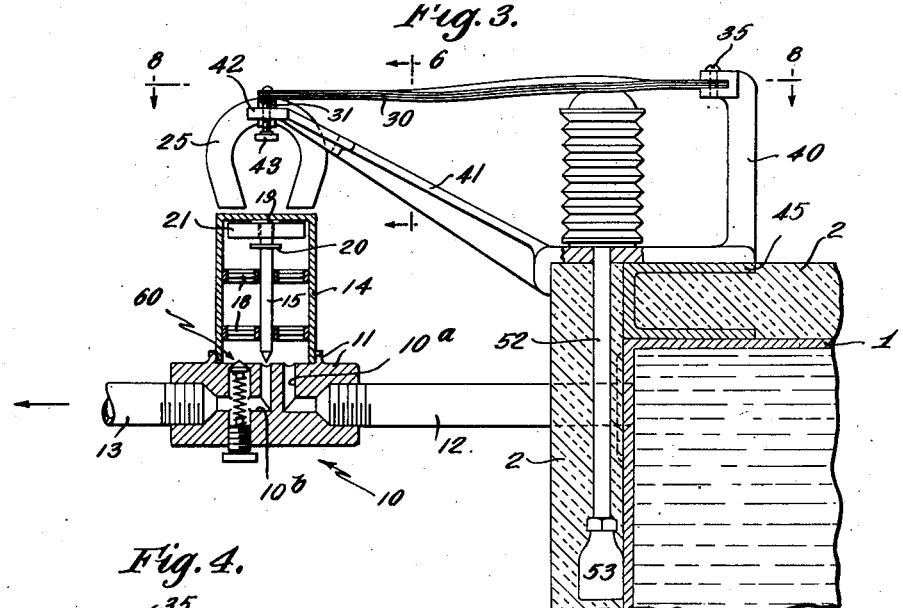
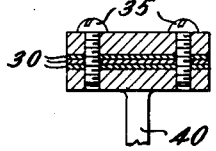
Inventor,
William E. Whitney,
by Roberts, Cushman & Woodbury
Attys.

Patented May 7, 1940

2,199,974

UNITED STATES PATENT OFFICE 2,199,974

CONTROLLING DEVICE

William E. Whitney, Cambridge, Mass., assignor, by mesne assignments, to Stator Corporation, a corporation of Rhode Island Application February 26, 1937, Serial No. 127,963

5 Claims. (Cl. 74—100)

This invention relates to control devices of the type which operate without direct mechanical connections between the controlling and controlled members. More particularly the principles of the present invention may be employed in a control arrangement for a valve which regulates the flow of liquid.

Heretofore most types of valves for this purpose have been characterized by parts likely to leak and/or deteriorate in the presence of liquid. The present invention avoids these disadvantages, since the controlling parts are not subject to corrosion and electrolytic deterioration in the presence of the liquid, while there is no necessity for employing sealing means such as bellows, packings, stuffing boxes, or the like. Valves of the type heretofore employed have often afforded very restricted valve openings in which particles of grit or the like would catch, preventing the firm seating of the valves and tending to cause deterioration and pitting of the interfitting surfaces. Certain valves operated by electromagnets have avoided such undesirable characteristics and have been opened or closed abruptly in such a manner that the valve would either afford a relatively large opening through which solid particles would be freely swept by the liquid or it would be positively closed. Such valves have permitted the valve seat to be kept clean of foreign particles so that an effective seal might be afforded by the valve when closed. However, such electromagnetically controlled valves would become inoperative upon the failure of the supply of electric current, and necessarily have been employed only where such current is available. The present invention affords a valve which permits the advantages of the electromagnetically controlled valve but without necessity for dependence upon a supply of electric current. Accordingly such a valve can be used in regions remote from electric current and is not liable to failure due to interruption of the electric current supply.

To permit these desirable results, I employ a permanent magnet preferably of the type which maintains a high flux density with very slight deterioration even over a very long period of time. Such permanent magnets have recently been developed which retain their magnetic properties so that they may be effectively employed over a period of years.

In accordance with this invention, a magnet of this type may be supported by a quick acting device which moves the magnet into a position wherein its armature may be within the effective field of the magnet or into a position wherein the armature is substantially out of this magnetic field. The armature may be separated from the magnet by a suitable sealing member or casing of non-ferrous metal or the like, and may operate a valve controlling the flow of liquid. When the quick acting supporting device brings the magnet into a position near the armature, the latter is attracted by the magnet and the valve is actuated. When the quick acting supporting device moves the magnet away from the armature, the valve returns to its original position, since the armature is no longer within the effective magnetic field. Preferably the quick acting supporting device may be in the form of a snap spring which may be controlled by any suitable controlling member, such as an expansible-contractible bellows.

More specifically this invention provides an arrangement of this character associated with an automatically controlled outlet valve for a fluid container, such as a hot water tank. With such an arrangement, if desired, all of the controlling parts, including the expansible-contractible bellows and the bulb associated therewith, may be disposed outside of the tank and out of contact with the liquid in the tank, thus avoiding danger of leakage and of deterioration due to corrosion or electrolytic action. Thus an arrangement of this character permits the valve to be enclosed in a sturdy casing of non-ferrous metal which is connected to the tank, while the permanent magnet, the snap spring or the like, the expansible-contractible bellows and the bulb associated with the same, may all, if desired, be located outside of the tank. A control device of this type is particularly advantageous in a dump valve assembly for a hot water tank, since the automatic operation of the device is not impaired by the failure of the supply of household current, and since the controlling parts are not subject to the relatively high rate of deterioration which is likely to exist in the presence of hot water.

In the accompanying drawings:

Fig. 2 is a sectional view of a portion of the tank with parts of the controlling device being shown in section and in elevation, the parts being shown in the position which they occupy when the valve is closed;

Fig. 3 is a similar view but with the parts shown in the position which they occupy when the valve is open;

Fig. 4 is a section on line 4—4 of Fig. 2;

Figure 1:
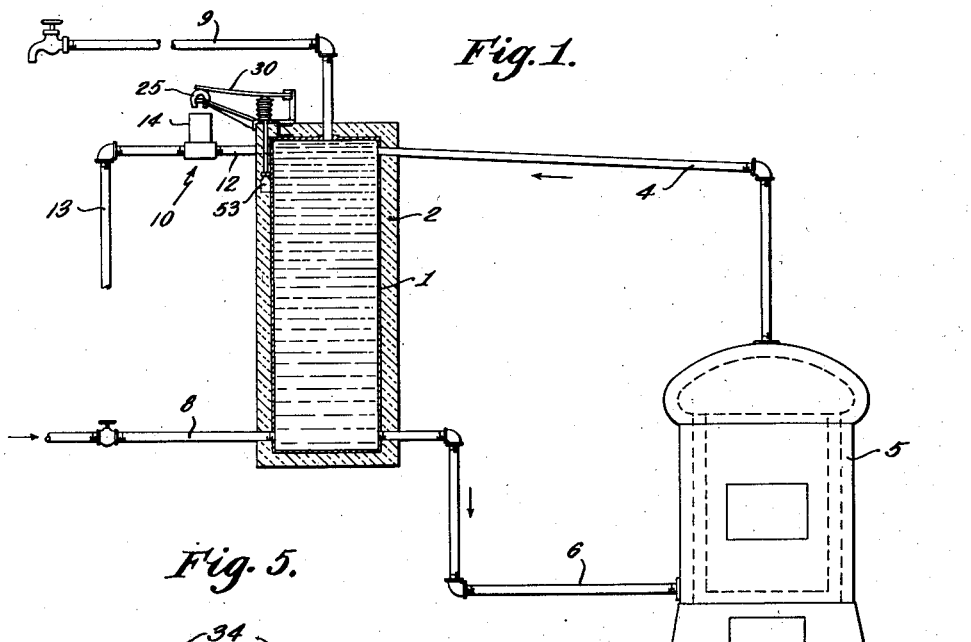
Fig. 1 is a schematic view of a hot water heating system with my improved controlling device associated therewith, the hot water tank being shown in section.
Figure 5:
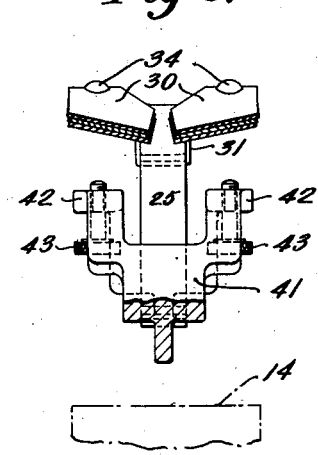
Figure 7:
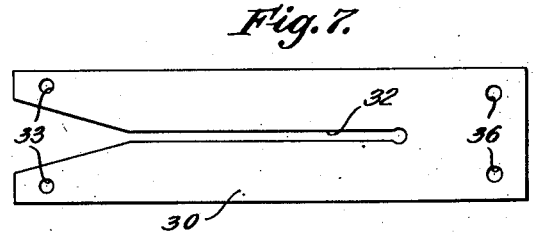
Figure 6:
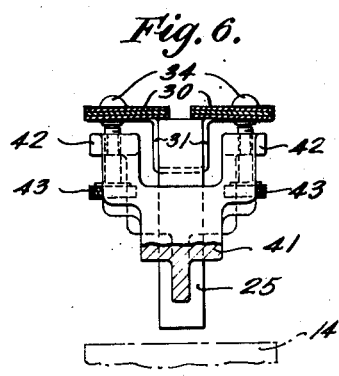
Figure 8:
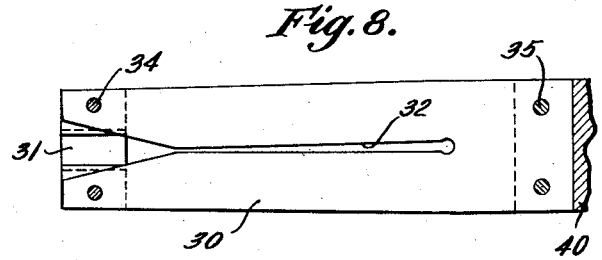

Figs. 5 and 6 are sections indicated by lines 5—5 and 6—6 of Figs. 2 and 3, respectively;

Fig. 7 is a plan view of the undistorted snap spring which is employed in the assembly shown in Figs. 2 and 3; and Fig. 8 is a section indicated by line 8—8 of Fig. 3 and showing the spring in its distorted operative position.

A controlling device of the general character described may be conveniently associated with a hot water tank 1 provided with an insulating jacket 2 and having a pipe connection 4 receiving hot water from a heater 5. A return pipe 6 connects the lower part of the tank 1 to the lower part of the heater so that thermosiphonic circulation normally occurs between the jacket of the heater and the tank 1. The tank is also provided with an inlet pipe 8 through which water may be supplied under pressure from the water mains or the like and with an outlet pipe 9 through which water may pass to the faucets in the house or the like.

In order to prevent the collection of overheated water in the tank 1, a suitable dump valve assembly is provided. As shown in Figs. 2 and 3, such an assembly may comprise a fitting 10 connected to the tank by a pipe section 12 and having a cuplike portion 11 supporting a cylindrical casing 14 of non-ferrous metal, e. g., brass or the like. The fitting 10 is provided with a passage 10$^a$ through which the water may pass into the casing 14 and with a passage 10$^b$ through which the water may pass from the casing into a drain 13. The casing 10 contains a valve spindle 15 which may be vertically disposed and which is slidably mounted in suitable spider-like guides 18. The upper part of the spindle 15 is provided with spaced collars 19 and 20 and an armature disk 21 is slidably mounted on the spindle, being free to move through a limited path between the collars 19 and 20. The lower part of the spindle 15 is beveled and normally fits within a seat formed at the mouth of the passage 10$^b$ of the fitting 10 (Fig. 2). Thus when this portion of the valve engages the valve seat the flow of water from the tank 1 through the pipe 13 is prevented. When, however, the valve is lifted from its seat, as shown in Fig. 3, water may flow through the casing 14 and through the passage 10$^b$ to the drain 13.

A permanent magnet 25 is arranged outside of the casing adjoining the armature 21 to control the armature and the valve. This magnet preferably is of the high efficiency type having a very low rate of deterioration of its magnetic properties. For example, such a magnet may have a flux density of the order of 8,000 gauss or more and the reluctance, a factor materially affecting permanency, may be very high, for example, over 200 oersted. A magnet of this type may be formed of an alloy of steel, nickel and aluminum, or such an alloy also including cobalt, or a steel alloy with nickel, cobalt and titanium or a steel alloy with chromium, tungsten and cobalt. The magnet 25 is supported by a suitable device which is effective either to hold the magnet juxtaposed to the wall of the casing 14 so that the armature 21 is within the effective magnet field (Fig. 3) or to hold the magnet substantially spaced from the casing so that the armature is substantially out of the effective magnetic field. This supporting device should be of the quick acting type so that the control of the valve may be accurately effected. For this purpose I preferably employ a snap spring 30. This spring may conveniently be of the multi-leaf type and the magnet may be supported by a small U-shaped bracket 31 secured to the outer end of this spring, as shown particularly in Figs. 2 and 6.

The outer end of the spring may be bifurcated by means of a relatively long slot 32; such a spring in its undistorted shape has the general form shown in Fig. 7, being provided with openings 33 at the end of each leg of its bifurcated portion. The shank portions of rivets 34 extend through these openings, these rivets being effective in securing the bracket 31 to the bifurcated end of the spring, and the openings providing slight clearances to permit the relative sliding movement of the leaves of the spring when the latter is distorted. The opposite end of the spring is provided with openings 36 which receive bolts 35 that are effective in holding this end of the spring clamped on a suitable bracket 40. The bracket 40 may be supported by a member 45 secured to the upper part of tank 1 and extending through the insulating layer 2. This bracket preferably is formed of metal of low heat conductivity, such as nichrome. The rivets 34 are arranged so that the ends of the legs of the bifurcated portion of the spring are distorted toward each other. The spring thus may possess the form shown in Fig. 8 and may be distorted so that its upper surface tends to have a concave curvature both transversely and longitudinally (Figs. 2 and 5). When the spring 30 possesses this form, the magnet is supported in non-operative, spaced relation to the casing 14 and the armature 21. In order to bring the magnet into operative relation to the armature, suitable thermostatic control means may be provided, for example, an expansible-contractible bellows 50 may be mounted on top of the tank 1 and may be connected by a tube 52 to a bulb 53 which is in heat transfer relation to the tank 1 and the liquid therein. I prefer to arrange the bulb and the tube, as well as the bellows, outside of the tank itself and out of contact with the liquid contained therein, thus avoiding liability of corrosion and electrolytic action. Thus, for example, the bulb may be disposed within the insulating layer 2 and in direct contact with the outer surface of the tank.

The upper end of the bellows 50 may be provided with a more or less semi-spherical portion 50$^a$ to contact the lower surface of the spring 30 adjoining the inner end of slot 32. Obviously the bellows 50, the tube 52 and the bulb 53 are filled with fluid which expands in the presence of heat so that the bellows expands when the water in the tank 1 is heated. Thus when the temperature of the water reaches the desired maximum point, the bellows may be effective in causing the spring to snap from the position shown in Fig. 2 to that shown in Fig. 3, thereby lowering the magnet so that its poles are close to the top of the casing 14 and the armature 21 is within the effective magnetic field. Accordingly the armature is drawn upwardly on the spindle 15 until it engages the collar 19 at the top of that spindle, then being effective in suddenly lifting the valve 15 into a point substantially spaced from the valve seat and permitting the flow of water through the fitting 10 and the drain 13.

When sufficient hot water has been dumped from the tank in this manner and replaced by cooler water received from the water mains through the pipe 8, the bellows 50 contracts and the pressure imposed by the bellows on the spring

30 is reduced so that the spring snaps back to its original shape, shown in Fig. 2, the magnet being suddenly lifted from the region of the casing 14 so that the armature 21 is no longer attracted toward the magnet by a sufficient force to offset its weight. The armature then drops along the spindle until it engages the lower collar 20, the weight of the falling armature and of the spindle being effective in quickly closing the valve.

In order to limit the movement of the spring so that it only assumes a position of unstable equilibrium when the magnet is lowered, the bracket 40 is provided with an arm 41 having extensions 42 straddling the magnet and providing abutments to limit the downward movement of the end of the spring 30. For example, set screws 43 may be afforded for this purpose, as shown particularly in Figs. 5 and 6. Accordingly when the spring is distorted in the manner shown in Figs. 3 and 6, the legs of its bifurcated portion may be twisted and the portion adjoining the magnet may bulge upwardly to a slight degree, but as soon as the pressure of the bellows 50 on the lower surface of the spring is materially reduced, the spring will snap back to its normal position shown in Fig. 2.

A pressure relief valve 60 may be associated with the fitting 10 to allow water to drain from the tank independently of the action of the valve spindle 15 when the pressure in the tank becomes undesirably high. Such a valve may be of the general type shown in Figs. 2 and 3 or of any suitable type. It is also evident that a vacuum valve may be associated with the fitting 10, if desired.

It is evident that the present invention affords a simple controlling device which may be employed where it is not desirable to have a direct mechanical connection between the controlling member and the controlled member. The general principles of this invention may be employed either to take advantage of the attractive or repellant effect of a magnetic field. Such an arrangement avoids the necessity of employing sealing members, such as packings, stuffing boxes or the like, while the valve is arranged to snap between its closed and opened positions. Accordingly when the valve is open, a clear opening of substantial dimensions is afforded, through which the water may flow with considerable velocity. Thus solid particles do not catch between the valve and its seat to prevent positive closing of the valve and to pit the valve seat or the valve. Such a device may operate indefinitely without necessity for dependence upon electrical current, thus danger of serious results due to failure of the electrical current is avoided and incidentally the cost of current for operating such a device is eliminated. Furthermore, the controlling parts, including the bellows, bulb and connecting tube, may be arranged entirely out of contact with the hot water in the tank, thus avoiding the corrosion and electrolytic deterioration of these parts which would otherwise tend to result.

I claim:

1. For actuating a device of the type having an armature and a permanent magnet for controlling the armature, apparatus comprising an actuating arm having one end fixedly secured to the permanent magnet, the actuating arm being of spring material and constructed and arranged to move with a snap action from a position in which the magnet is closely adjacent to the armature to a position in which the magnet is substantially spaced from the armature, and means operative to stress said arm thereby to cause it to snap in a direction such as suddenly to move the magnet in the direction away from the armature.

2. For actuating a device of the type having an armature and a magnet for controlling the armature, apparatus comprising a spring member for actuating the magnet, the spring member being constructed and arranged to snap the magnet back and forth between a position adjacent the armature and a position remote from the armature in response to stress applied to the spring member, a support for the spring member, and means interposed between the support and spring member for stressing the spring member, thereby to snap the magnet as aforesaid.

3. For actuating a device of the type having an armature and a magnet for controlling the armature, apparatus comprising a spring member for actuating the magnet, the spring member being constructed and arranged to snap the magnet back and forth between a position adjacent the armature and a position remote from the armature in response to stress applied to the spring member, means for fixedly mounting the magnet on said spring member, a support for the spring member, and means interposed between the support and spring member for stressing the spring member, thereby to snap the magnet as aforesaid.

4. For actuating a device of the type having an armature and a magnet for controlling the armature, apparatus comprising a spring member for actuating the magnet, the spring member being constructed and arranged to snap the magnet back and forth between a position adjacent the armature and a position remote from the armature in response to stress applied to the spring member, a support for the spring member, and means interposed between the support and spring member for stressing the spring member, thereby to snap the magnet as aforesaid, said means comprising an expansible bellows.

5. For actuating a device of the type having an armature and a magnet for controlling the armature, apparatus comprising a spring member for actuating the magnet, the spring member being constructed and arranged to snap the magnet back and forth between a position adjacent the armature and a position remote from the armature in response to stress applied to the spring member, a support for the spring member, and means interposed between the support and spring member for stressing the spring member, thereby to snap the magnet as aforesaid, said spring member comprising a leaf having a bifurcated end portion subject to transverse pressure so that the spring is provided with both a transverse and a longitudinal concavo-convex curvature which is reversed when the spring is actuated by said means, thereby to snap the magnet from one position to the other.

WILLIAM E. WHITNEY.